US011109537B2

(12) United States Patent
Neitemeier et al.

(10) Patent No.: US 11,109,537 B2
(45) Date of Patent: *Sep. 7, 2021

(54) FORAGE HARVESTER WITH A MAGNETIC ASSEBMLY

(71) Applicant: CLAAS Selbstfahrende Erntemaschinen GmbH, Harsewinkel (DE)

(72) Inventors: Dennis Neitemeier, Lippetal (DE); Christoph Heitmann, Warendorf (DE); Jochen Huster, Gütersloh (DE); Markus Brune, Harsewinkel (DE); Boris Kettelhoit, Gütersloh (DE)

(73) Assignee: CLAAS Selbstfahrende Erntemaschinen GmbH, Harsewinkel (DE)

( * ) Notice: Subject to any disclaimer, the term of this patent is extended or adjusted under 35 U.S.C. 154(b) by 371 days.

This patent is subject to a terminal disclaimer.

(21) Appl. No.: 16/217,537

(22) Filed: Dec. 12, 2018

(65) Prior Publication Data
US 2019/0174680 A1  Jun. 13, 2019

(30) Foreign Application Priority Data
Dec. 13, 2017 (DE) .......................... 102017129778.2

(51) Int. Cl.
*A01D 43/08* (2006.01)
*A01F 29/06* (2006.01)
(Continued)

(52) U.S. Cl.
CPC ............ *A01F 29/22* (2013.01); *A01D 43/085* (2013.01); *A01F 29/06* (2013.01); *A01F 29/095* (2013.01); *G01B 7/293* (2013.01)

(58) Field of Classification Search
CPC ... B62D 7/08; B62D 7/26; A01F 29/06; A01F 29/095; A01F 29/22; A01F 15/08;
(Continued)

(56) References Cited

U.S. PATENT DOCUMENTS

| 3,757,501 | A | * | 9/1973 | Bennett, Jr. | ............ G01V 3/107 460/2 |
| 4,198,006 | A | * | 4/1980 | Rolfe | .................... A01F 29/095 241/222 |
| 4,412,212 | A | * | 10/1983 | Kolegraff | ................. B26D 7/26 340/684 |
| 6,255,812 | B1 | * | 7/2001 | Voigt | ....................... G01B 7/14 324/207.15 |

(Continued)

FOREIGN PATENT DOCUMENTS

DE   102014218408 A1   4/2015
EP     0943888 A2   9/1999
(Continued)

OTHER PUBLICATIONS

European Search Report for European Patent Application No. 18200321.0-1006-1230 dated May 14, 2019.

*Primary Examiner* — Adam J Behrens
(74) *Attorney, Agent, or Firm* — Lempia Summerfield Katz LLC

(57) ABSTRACT

A forage harvester comprising an edge sharpness detection device for detecting a degree of edge sharpness of a cutting mechanism. The cutting mechanism comminutes a stream of harvested material, with a material inflow area being defined where the cutting blades interact with the shear bar to comminute the harvested material. The edge sharpness detection device excites one or more magnetic circuits, with the respective magnetic circuit being closed by the respective cutting blade during rotation of the cutter drum once one of the cutting blades passes the magnetic assembly. The edge sharpness detection device detects the magnetic flux in the respective magnetic circuit and, based on a detected change, determines a degree of edge sharpness of the respective cutting blade. Further, the magnetic flux of the magnetic (Continued)

circuit may be guided lengthwise in the cutting blade at least along a longitudinal section of the respective cutting blade.

20 Claims, 3 Drawing Sheets

(51) Int. Cl.
*A01F 29/22* (2006.01)
*A01F 29/09* (2010.01)
*G01B 7/293* (2006.01)

(58) Field of Classification Search
CPC ......... A01F 12/40; A01D 43/085; G01B 7/14; G01B 7/293
See application file for complete search history.

(56) References Cited

U.S. PATENT DOCUMENTS

| | | | |
|---|---|---|---|
| 10,568,271 B2* | 2/2020 | Neitemeier | A01F 15/08 |
| 2004/0168528 A1* | 9/2004 | Heinrich | B26D 7/12 |
| | | | 73/865.9 |
| 2007/0130900 A1* | 6/2007 | Kormann | A01D 43/085 |
| | | | 56/10.2 C |
| 2015/0323301 A1 | 11/2015 | Zhe et al. | |
| 2018/0235154 A1* | 8/2018 | Neitemeier | G01B 7/293 |

FOREIGN PATENT DOCUMENTS

| | | | | |
|---|---|---|---|---|
| EP | 2311601 B1 * | 8/2012 | | B24B 3/368 |
| EP | 3363281 A1 | 8/2018 | | |

\* cited by examiner

FORAGE HARVESTER WITH A MAGNETIC ASSEBMLY

CROSS REFERENCE TO RELATED APPLICATION

This application claims priority under 35 U.S.C. § 119 to German Patent Application No. DE 102017129778.2, filed Dec. 13, 2017, the entire disclosure of which is hereby incorporated by reference herein.

TECHNICAL FIELD

The technical field relates to an agricultural machine. More specifically, the technical field relates to a forage harvester comprising an edge sharpness detection device configured to detect a degree of edge sharpness of a cutting mechanism for the comminution of a stream of harvested material.

BACKGROUND

A field harvester may be equipped with a cutting mechanism, such as a chopper, that has a cutter drum with elongated cutting blades arranged thereupon, as well as a stationary shear bar or counter-blade. The harvested material supplied to the cutter drum is chopped, e.g., comminuted, by the interaction between the cutting blades and shear bar.

During chopping, the cutting mechanism experiences wear, such as wear to the cutting blades. In particular, there is wear-related abrasion in the area of the cutting edges of the cutting blades, which causes a reduction in the cutting quality and throughput of harvested material.

In particular, the wear to the cutting blades, such as in the area of the cutting edges of the cutting blades, may result in modifying the cutting edge geometry and in an enlargement of the engagement gap between the cutting edge and shear bar. The cutting edge geometry can only be restored by re-grinding the cutting blades, whereas the engagement gap between the cutting edge and shear bar can be regularly adjusted by advancing the shear bar. With modern forage harvesters, both measures can be accomplished automatically without requiring the forage harvester to be transferred to a workshop; however, they must be initiated at the proper time. Accordingly, particular importance is ascribed to precisely detecting the degree of edge sharpness of the cutting mechanism.

German Published Application No. DE 10 2014 218 408 A1 discloses a system for detecting the sharpness of a plurality of knives distributed around the circumference of a cutterhead. In particular, German Published Application No. DE 10 2014 218 408 A1 discloses a magnetic sensor which generates a magnetic flux in the gap between the bedknife and the cutting edges of the knives, a flow sensor generating an electrical signal indicating the passing cutting edges on the magnetic flux in the gap, and an evaluation unit configured to calculate a radius representing the sharpness of the cutting edges according to an equation.

DESCRIPTION OF THE FIGURES

The present application is further described in the detailed description which follows, in reference to the noted plurality of drawings by way of non-limiting examples of exemplary implementation, in which like reference numerals represent similar parts throughout the several views of the drawings, and wherein.

DETAILED DESCRIPTION

Figure 1:
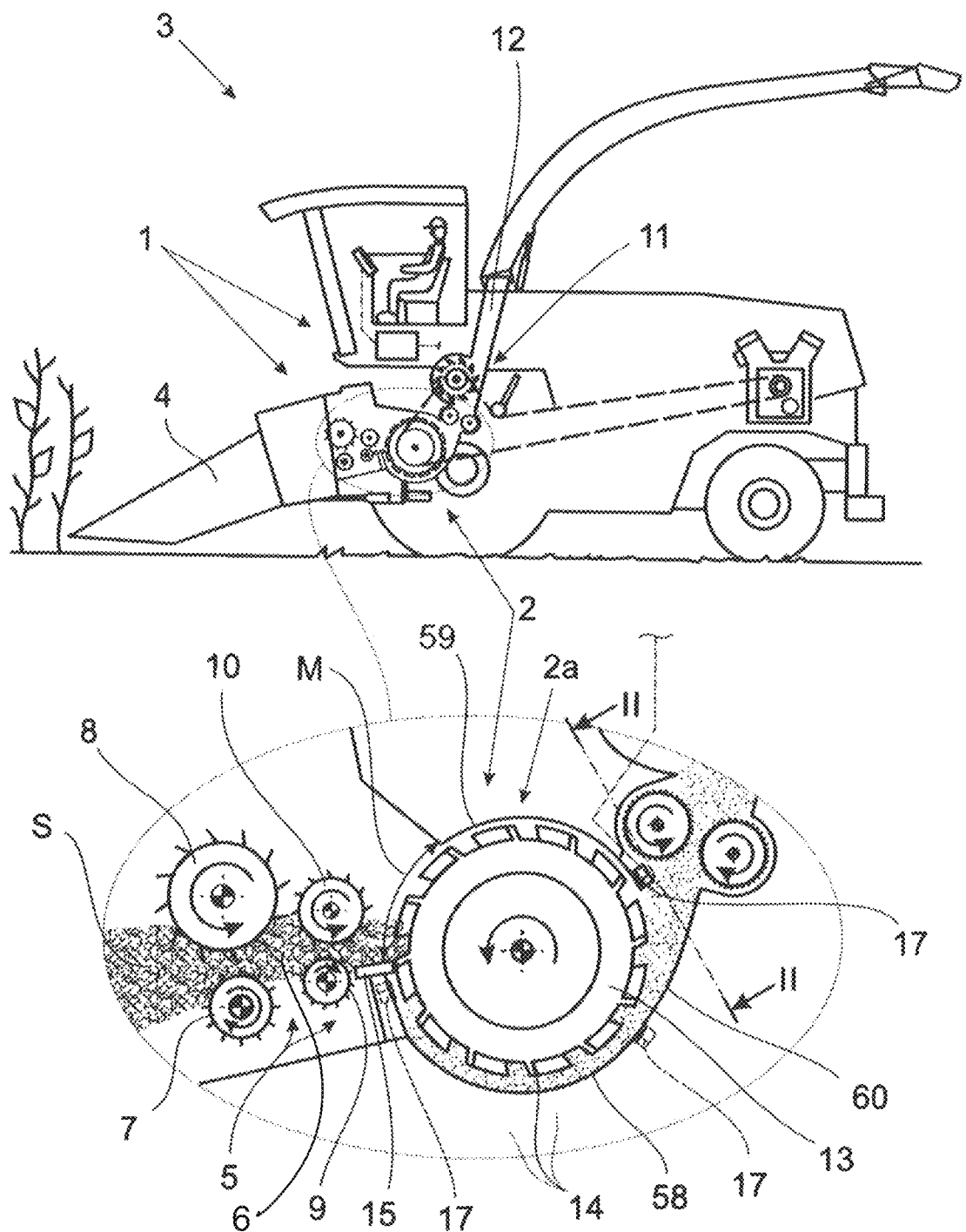
FIG. 1 is a schematic illustration of one implementation of the forage harvester, the forage harvester including a cutting mechanism and an edge sharpness detection device.

The methods, devices, systems, and other features discussed below may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein. Further, variations in the processes described, including the addition, deletion, or rearranging and order of logical operations, may be made without departing from the spirit or scope of the claims as set forth herein.

Edge sharpness detection devices, such as disclosed in German Published Application No. DE 10 2014 218 408 A1, may attempt to detect a degree of edge sharpness of a cutting mechanism based on a distance, such as the engagement gap, between the cutting blades and the shear bar, which can form a gap in a magnetic circuit so that the degree of cutting sharpness of the relevant cutting blades can be inferred from the change in the magnetic flux. To do this, the edge sharpness detection device is equipped with a magnetic assembly. Specifically, when the chopping blade passes the blade magnetic assembly, the magnetic assembly generates a magnetic flux which penetrates the relevant cutting blade transverse to its longitudinal extension. In so doing, the resulting magnetic flux depends, among other things, on the degree of edge sharpness of the relevant cutting blade so that the degree of edge sharpness may be inferred therefrom.

However, such a blade cutting detection device is disadvantageous in that the detection of the degree of cutting edge sharpness only affects a single measuring point along the longitudinal extension of the relevant cutting blade. This can cause a misestimation of the degree of edge sharpness, such as, for example, when a single flaw of the cutting blade exists precisely at this measuring point, but the cutting blade is otherwise wear-free. To prevent such a misestimation, a plurality of edge sharpness detection devices are arranged along the cutting blade passing the magnetic assembly, which would increase the cost of the blade cutting detection device.

In one implementation, the forage harvester includes the cutting mechanism and the edge sharpness detection device. The cutting mechanism includes a cutter drum (including a plurality of cutting blades) and at least one shear bar that interacts with the cutting blades to comminute a harvested material stream, whereby the harvested material stream is supplied to the cutting mechanism by a prepressing unit. In particular, a material inflow area is defined as the location at which the harvested material stream is conveyed or exited from the prepressing unit and/or supplied to an operating area in which the cutting blades interact with the at least one shear bar to comminute the harvested material. In practice, the edge sharpness detection device is configured to excite at least one magnetic circuit by using a magnetic assembly, wherein a respective magnetic circuit is closed by the respective cutting blade during a rotation of the cutter drum once one of the cutting blades passes the magnetic assembly.

The edge sharpness detection device is configured to detect the magnetic flux in the respective magnetic circuit and, based on a detected change of a magnetic measurand relating to the magnetic flux, the edge sharpness detection device is configured to determine at least one aspect of edge sharpness (e.g., determine a decrease in the degree of edge sharpness of the respective cutting blade). Further, in a specific implementation, at least part of the magnetic flux of the magnetic circuit closed by the respective cutting blade is guided lengthwise in the cutting blade at least along a longitudinal section of the respective cutting blade, with the magnetic assembly being positioned outside of the material inflow area of the cutting mechanism.

Thus, in one implementation, the edge sharpness detection device has a magnetic assembly which generates a magnetic flux once one of the cutting blades of the cutter drum passes the magnetic assembly. During a rotation of the cutter drum, at least part of the cutting blade cyclically passes the magnetic assembly. Once the respective cutting blade passes the magnetic assembly, a magnetic circuit, which is excited by the magnetic assembly, is closed. The magnetic flux that results in this magnetic circuit depends on the degree of edge sharpness of the respective cutting blade.

Correspondingly, the edge sharpness detection device may be configured to detect the magnetic flux in the respective magnetic circuit and to determine the degree of edge sharpness therefrom. Specifically, the degree of edge sharpness results from the wear-related abrasion of the cutting edge of the respective cutting blade and the associated increase in the width of the gap between the cutting edge of the cutting blade and the magnetic assembly. As the gap width increases, a measurand or other type of indicator that characterizes the magnetic flux correspondingly also changes; for example, the field strength in the respective magnetic circuit correspondingly decreases. As a result, a decrease in the degree of edge sharpness of the respective cutting blade may be inferred from a change in the magnetic flux.

In one implementation, at least a part of the magnetic flux of the magnetic circuit closed by the respective cutting blade is guided longitudinally in the cutting blade, such as at least over a longitudinal section of the respective cutting blade. This is in contrast to other solutions, whereby the magnetic flux is no longer guided transversely in the respective cutting blade, but rather longitudinally. The determination of a decrease in the degree of edge sharpness by the edge sharpness detection device accordingly relates to at least a part (e.g., more than a single point) of the respective longitudinal section of the cutting blade (such as to the entire aforementioned respective longitudinal section of the cutting blade), so that a single flaw mentioned above is less important when determining the degree of edge sharpness.

Alternatively, or in addition, the magnetic assembly is positioned outside of the area of material infeed or inflow. As discussed above, the material inflow area is the area in the direction of flow before the cutter drum that can be filled by the harvested material, which is supplied to the operating area of the respective cutting blade and the shear bar. On the cutter-drum-side end, this area has in particular a cross-section which is defined by the cross-section of an opening that, relative to the direction of rotation of the cutter drum, extends from one edge of the housing drum in which the cutter drum rotates, up to an edge formed by the shear bar. Over at least a part the cross-section or area (such as this entire cross-section or area), the material of the harvested material stream can be supplied to the location at which the cutting blades interact as intended with the at least one shear bar. In one implementation, the material inflow area is defined as the area or cross-section that the harvested material stream occupies or fills when it has been preformed, in particular prepressed into a mat of material before reaching the cutter drum. In this implementation, the magnetic assembly is arranged or positioned at least partly outside of this material inflow area (such as entirely outside of this material inflow area) in order to prevent potential wear of the components of the magnetic assembly by the still comparatively large material of the harvested material stream in the area before the cutting mechanism. In this way, the magnetic assembly may be positioned so that it lies outside (such as entirely outside) of the harvested material stream.

In one implementation, the magnetic assembly is positioned at a location at which the harvested material stream comminuted by the cutting blades and shear bar passes by. In this implementation, the magnetic assembly may either be arranged so that it does not come in contact with the harvested material stream. Alternatively, the magnetic assembly may be positioned so that it comes into contact with the harvested material stream, wherein the harvested material stream in the latter case flows by the magnetic assembly.

In one implementation, the cutting mechanism has a housing drum surrounding the cutter drum, wherein the harvested material stream is moved away from the shear bar after its comminution effectuated by the interaction of the cutting blades and shear bar between the cutter drum and the housing drum. In this case, the housing drum forms a stationary part of the cutting mechanism, whereas the cutter drum forms the rotating part of the cutting mechanism.

The magnetic assembly may be positioned outside of the material inflow area of the cutting mechanism in one of several places. For example, the magnetic assembly may be positioned outside of the area between the cutter drum and the housing drum through which the harvested material stream is removed after its comminution since there is hardly any wear in that position of the components of the magnetic assembly. More specifically, the magnetic assembly may be positioned outside of the housing drum (e.g., outside of the housing drum surrounding the cutter drum). In this case, the magnetic flux of the magnetic assembly is conducted through a corresponding section of the housing drum to the respective of cutting blade. Alternatively, the magnetic assembly may be positioned within the area between the cutter drum and housing drum through which the harvested material stream is removed after its comminution, since the material of the harvested material stream has a significantly smaller wearing influence on the components of the magnetic assembly due to the prior comminution in the operating area of the cutting blades and shear bar than the comparatively large material of the harvested material stream before the cutting mechanism.

In one implementation, the magnetic assembly does not come into contact with the harvested material stream at all during at least a part of the processing of the harvested material stream (e.g., the magnetic assembly does not come into contact with the harvested material stream before its comminution and/or after its comminution). As noted, in one implementation, the magnetic assembly does not come into contact with the harvested material stream at all.

As discussed above, there are several contemplated positions at which the magnetic assembly may be positioned. As one example, the magnetic assembly may be positioned behind the shear bar relative to the rotational direction of the cutter drum. Relative to the direction of gravity, the magnetic assembly may be positioned vertically below the shear bar. As another example, the magnetic assembly may be positioned relative to at least a part of the housing drum. In particular, the housing drum may comprise comprises a drum floor, a drum top, and a drum rear wall. The magnetic assembly may be positioned on the drum floor, on the drum top, or on a drum rear wall of the housing drum. Specifically, the magnetic assembly may be positioned outside on the drum floor, outside on the drum top, or outside on the drum rear wall.

In one implementation, at least one, some, or all of the following is made of a nonmagnetic material (e.g., stainless steel): the housing drum; the drum floor; the drum top; the drum rear wall. In this manner, the material of the housing drum does not influence the magnetic flux when the magnetic assembly is positioned outside of the housing drum.

Referring to the figures, FIG. 1 is a schematic illustration of one implementation of the forage harvester, the forage harvester including a cutting mechanism and an edge sharpness detection device. The edge sharpness detection device 1 represented in FIG. 1 is configured to detect at least one aspect of edge sharpness, such as a degree of edge sharpness, of a cutting mechanism 2, which is associated with a forage harvester 3 and configured to process a harvested material stream S. In this implementation, the forage harvester 3 includes a harvesting header 4. The forage harvester 3 furthermore includes a prepressing unit 5 that functions as a feed device for the harvested material. The prepressing unit 5 is equipped with at least two prepressing rollers, such as four prepressing rollers 7, 8, 9, 10 illustrated in FIG. 1, that forms a pressing channel 6. In the implementation illustrated in FIG. 1, the front prepressing rollers 7, 8 undertake preliminary compression of the received harvested material, whereas the rear prepressing rollers 9, 10 undertake even further compression and further transportation of the harvested material. In one implementation, the pressing channel 6 forms the material inflow area M, e.g., the area through which the material of the harvested material stream S moves before it reaches the angled area of the cutting mechanism 2 in the subsequent path.

The received harvested material is chopped in the cutting mechanism 2, which is followed by another delivery apparatus 11 for transporting the chopped harvested material to an ejection channel 12. In one implementation, the cutting mechanism 2 has a cutter drum 13 with long cutting blades 14 arranged thereupon, as well as at least one shear bar 15 that interacts with the cutting blades 14 in the chopping process. The implementation illustrated in FIG. 1 includes a cutting mechanism that consists of a single shear bar 15. The location at which the cutting blades 14 interact with the shear bar 15 may be defined as the operating area.

The cutter drum 13 is arranged in a drum housing 2a that seals the cutting mechanism 2 to the outside. The drum housing 2a is a drum-like housing in the broadest sense that, in this case relative to the direction of gravity, is formed at the bottom by a drum floor 58, at the top by a drum top 59, and to the rear by a drum rear wall 60.

Figure 2:
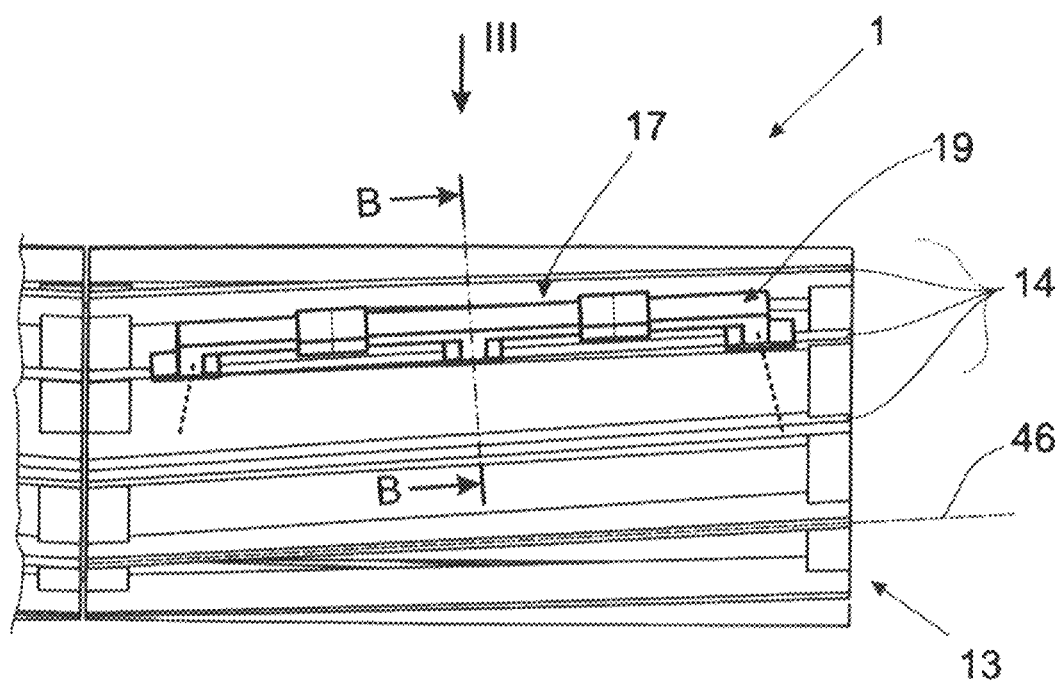
FIG. 2 illustrates the edge sharpness detection device of the forage harvester depicted in FIG. 1 in view II-II.
Figure 2:
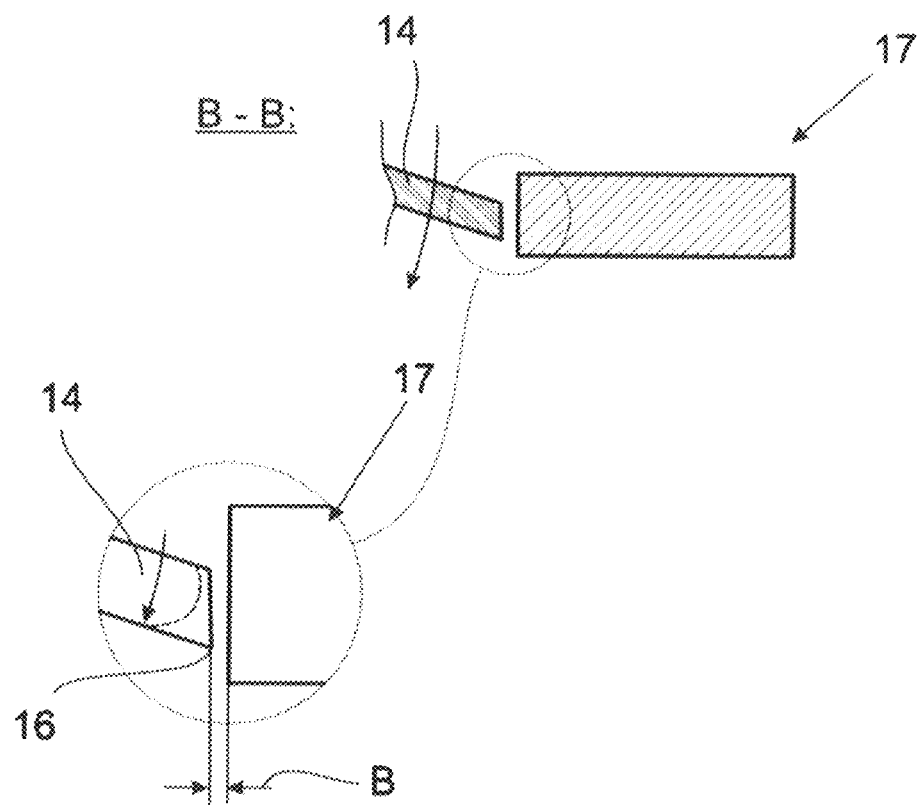

In the sectional representation B-B therein, FIG. 2 shows the basic design of the cutting blade 14 and shear bar 15. The cutting blade 14 has a cutting edge 16 whose degree of edge sharpness is pertinent to the achievable cutting quality. Potential wear-related abrasion of the cutting edge 16 is indicated in a dashed line in this representation as per FIG. 2. The left detailed representation in FIG. 3 illustrates that the wear-related abrasion over the longitudinal extension of the relevant cutting blade 14 may be uneven.

The edge sharpness detection device 1 has at least one magnetic assembly 17 which includes a magnetic exciter assembly 18 and a flux guiding device 19, which is magnetically coupled to the exciter assembly 18. More specifically, the edge sharpness detection device 1 includes only one magnetic assembly 17 in order to generate the magnetic field sufficient to perform the edge sharpness detection along an area of the cutting edge 16.

Figure 3:
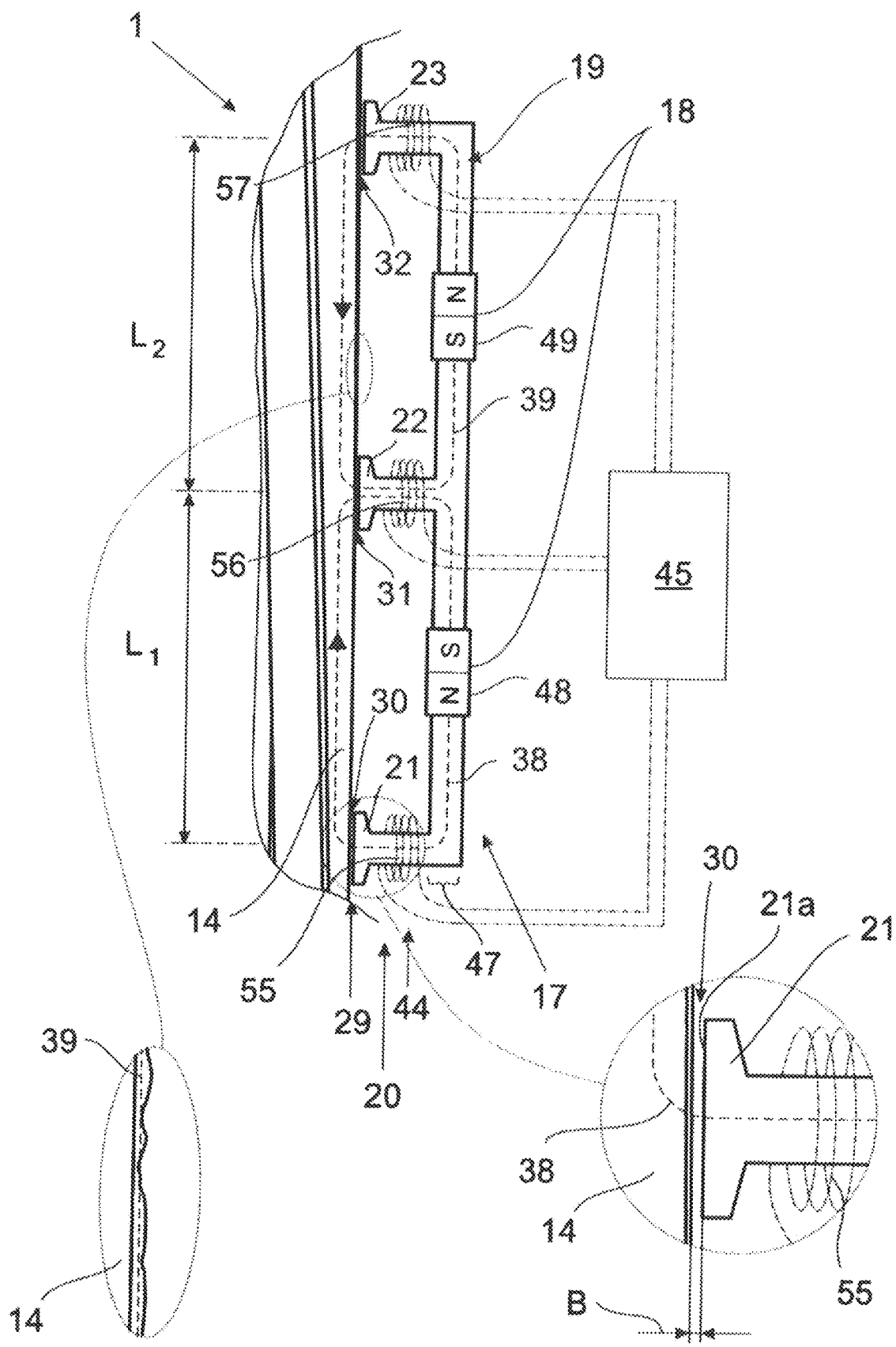
FIG. 3 illustrates the edge sharpness detection device depicted in FIG. 2 in view III.

FIG. 3 illustrates the basic design of the magnetic assembly 17. As shown, the magnetic assembly 17 provides a stationary pole assembly 20 relative to the cutter drum 13 that forms at least one magnetic pole (such as magnetic poles 21, 22, 23) with a pole surface to discharge magnetic flux. Such a pole surface is provided for example with reference sign 21a in FIG. 3 for the pole 21.

The cutter drum 13 of the forage harvester 3 shown in FIG. 1 is axially bifurcated and has, viewed in the direction of travel, a left drum half and a right drum half. FIG. 2 shows the right drum half. The left drum half is constructed analogously and is also equipped with a proposed edge sharpness detection device 1. In this regard, the teaching illustrated in FIG. 2 may likewise be applied to the left drum half.

During a rotation of the cutter drum 13, at least part of the cutting mechanism, such as the cutting blade 14 of the right drum half, passes the pole assembly 20. In so doing, the cutting blade 14 passing the pole assembly 20 briefly forms an air gap assembly 29 with at least one air gap 30, 31, 32 to the pole assembly 20. FIG. 3 furthermore shows that at least one magnetic circuit 38, 39 excited by the exciter assembly 18 is thereby closed by the respective cutting blade 14. Given that the resulting magnetic flux in the respective magnetic circuit 38, 39 from a given magnetic excitation depends on the geometry and width B of the respective air gap 30, 31, 32 and given the representation illustrated in FIG. 2, the degree of edge sharpness of the respective cutting blade 14 may be determined based on the resulting magnetic flux. In particular, a determined change in the magnetic flux of the magnetic circuit 38 is representative of a degree of edge sharpness of longitudinal section $L_1$, and a determined change in the magnetic flux of the magnetic circuit 39 is representative of a degree of edge sharpness of longitudinal section $L_2$. In this way, the edge sharpness detection device is configured to detect a first flaw in longitudinal section $L_1$ of the respective cutting blade based on the determined change in the magnetic flux of magnetic circuit 38, and configured to detect a second flaw in longitudinal section $L_s$ of the respective cutting blade based on the determined change in the magnetic flux of magnetic circuit 39. Thus, the edge sharpness detection device may detect different flaws in different sections of the respective cutting blade using the single magnetic assembly 17.

In one implementation, at least one aspect of the magnetic flux may be analyzed in order to determine the edge sharpness, such as a degree of edge sharpness. In a first specific implementation, a change in the magnetic flux may be analyzed in order to determine the degree of edge sharpness. In particular, the change in the magnetic flux, such as a derivative (e.g., the first derivative) of the magnetic flux in the time domain addressed below relative to the situation with a wear-free cutting blade 14, may be determined in order to represent the degree of edge sharpness. Thus, the value of this change in the magnetic flux may accordingly represent the degree of edge sharpness. In a second specific implementation, it is contemplated to calculate from the at least one determined magnetic measurand a value for the wear-related width of at least one air gap 30, 31, 32 of the air gap assembly 29, or the wear-related geometry of the cutting edge 16 of the relevant cutting blade 14, which then may also represent the degree of edge sharpness.

In this implementation, the disclosed edge sharpness detection device 1 has a measuring assembly 44 and an evaluation unit 45, wherein the measuring assembly 44 detects (in one implementation solely by itself) at least one magnetic measurand or criterion relating to the magnetic flux in at least one magnetic circuit 38, 39 excited by the exciter assembly 18, and wherein the evaluation unit 45 (again, in one implementation solely by itself) determines the degree of edge sharpness of the relevant cutting blade 14 from the at least one detected measurand or criterion. Additional details as to the detection and determination are explained further below.

In one implementation, at least part of the magnetic flux generated by the magnetic exciter assembly 18 is guided in the cutting blade 14 at least partly along a longitudinal section $L_1$, $L_2$ of the cutting blade 14 passing the magnetic assembly 17 or the pole assembly 20. Longitudinal sections $L_1$, $L_2$ are illustrated in FIG. 3 as not co-extensive, such as abutting one another. Though only two longitudinal section $L_1$, $L_2$ are shown, more than two longitudinal sections are contemplated. In one implementation, the magnetic flux is guided in the cutting blade 14 along the entire length of the cutting blade 14 passing the magnetic assembly 17 or the pole assembly 20. The basic path of the magnetic flux is illustrated in the drawing from the representation of the associated magnetic circuit 38, 39.

The term "along" in association with the cutting blades 14 may refer to the elongated design of the cutting blade 14. Accordingly, in one implementation, the term "along" refers to the longitudinal extension of the cutting blades 14 illustrated in FIG. 2 for example with reference sign 46.

In one implementation, the pole assembly 20 has at least two magnetic poles, such as three magnetic poles 21, 22, 23, four magnetic poles, etc., at a distance from each other along the cutting blade 14 passing the pole assembly 20 such that each form an air gap 30, 31, 32 of the air gap assembly 29 together with the cutting blade 14, and between which the magnetic flux generated by the magnetic exciter assembly 18 is guided along the cutting blade 14. This allows the degree of edge sharpness of the cutting blade 14 to also be determined in the longitudinal section $L_1$, $L_2$ between at least two poles 21, 22, 23 (such as between poles 21 and 22, or poles 22 and 23). This is illustrated, for example, in FIG. 3 for a total of three poles 21, 22, 23.

One may adjust the area in which the degree of edge sharpness should be detected by the positioning of the poles 21, 22, 23 along the passing cutting blade 14. It is also contemplated to design the magnetic assembly 17 such that the degree of edge sharpness is separately detectable for different longitudinal sections $L_1$, $L_2$ of the relevant cutting blade 14. This may, for example, be accomplished in that the flux guiding device 19 has two or more sections formed separate from each other.

Separate detection of the degree of edge sharpness for different longitudinal sections $L_1$, $L_2$ of the relevant cutting blade 14 may be useful when the wear of the cutting blades 14 changes over the longitudinal extension of the cutting blade 14. Wear along the longitudinal extension of the cutting blade 14 may be uneven, for example, the wear on the outer sides of the cutter drum 13 being greater than in the middle of the cutter drum 13 so that a spherical shape of the cutter drum 13 correspondingly results. In this regard, the separate detection of the degree of edge sharpness may be focused on a subpart of the cutting blade 14, such as one or both of the outer sides and/or in the middle.

In one implementation, the detection of the degree of edge sharpness in different longitudinal sections $L_1$, $L_2$ is based on the pole assembly 20 forming at least three magnetic poles 21, 22, 23 which are at a distance from each other (such as an equal distance from each other) along the cutting blade 14 passing the pole assembly 20, with each forming an air gap 30, 31, 32 of the air gap assembly 29 together with the cutting blade 14 passing the pole assembly 20. This is illustrated in FIG. 3. In one implementation, at least one of the poles 21, 22, 23, such as pole 22, is a component of two magnetic circuits 38, 39 excited by the magnetic exciter assembly 18. Determination of the magnetic flux flowing through the two magnetic circuits 38, 39 provides information as noted above on the degree of edge sharpness of the respective cutting blade 14 in the longitudinal sections $L_1$ and $L_2$.

A particularly low-loss design of the magnetic circuits 38, 39 results when at least one, some, or all of the poles 21, 22, 23, such as all poles 21, 22, 23 of the pole assembly 20 as illustrated in FIG. 3, are arranged along the cutting edge 16 of the cutting blade 14 passing the pole assembly 20.

One implementation of the flux guiding device 19 is shown in FIG. 3. Here, the flux guiding device 19 has a central section 47 from which the poles 21, 22, 23 of the pole assembly 20 branch off. In one implementation, the central section 47 of the flux guiding device 19 is designed straight, as illustrated in FIG. 3. Alternatively or in addition, the central section 47 of the flux guiding device 19, as shown in FIG. 3, can run along the cutting edge 16 of the cutting blade 14 passing the pole assembly 20. This yields an overall symmetrical structure of the flux guiding device 19, which may further simplify the determination of the degree of edge sharpness of the respective cutting blade 14.

Several variations are contemplated for the exciter assembly 18. In one implementation, the exciter assembly 18 has at least one exciter magnet 48, 49 which is designed as a permanent magnet. Alternatively, the exciter magnet 48, 49 may also be an electromagnet. In the implementation illustrated in FIG. 3, the exciter magnets 48, 49 are arranged in a section of the flux guiding device 19, in this case in the central section 47 of the flux guiding device 19.

The measuring assembly 44 in this implementation has at least one measuring unit 55, 56, 57 for detecting the at least one measurand based on magnetic flux. FIG. 3 illustrates a particularly straightforward implementation of the measuring units 55, 56, 57. In this case, a measuring unit 55, 56, 57 has a coil assembly through which the magnetic flux in the flux guiding device 19 flows. By the rotation of the cutter drum 13, the above-addressed air gap assembly 29 is cyclically generated and unmade (or dissipated and/or cancelled) so that a correspondingly cyclical change of the magnetic flux within the time domain results in at least one of the magnetic circuits 38, 39. In this case, the measuring unit 55, 56, 57 may detect at least one aspect of the circuit as a measurand, such as detecting the voltage induced in the coil assembly as a measurand. The measurand thus may correspond to the first derivation or derivative of the relevant magnetic flux within the time domain from which, potentially with reference to the wear-free state, a value can be determined as an indication of the degree of edge sharpness of the relevant cutting blade 14.

As explained above, the measurand determined by the measuring assembly 44 changes depending on the degree of edge sharpness. Thus, the degree of edge sharpness may be derived from the determined measurand. In one implementation, the evaluation unit 45 may perform this determination. In particular, the evaluation unit 45 may comprise at least one microprocessor and at least one memory unit in order to perform these calculations and determinations. The microprocessor of the evaluation unit 45 may comprise any type of controller, such as processor, a microcontroller, an Application Specific Integrated Circuit (ASIC), Programmable Logic Device (PLD), or Field Programmable Gate Array (FPGA), or the like. The memory unit of the evaluation unit 45 may comprise one or more types of storage medium, such as volatile memory and/or non-volatile memory. Further, the microprocessor and storage medium may be separate devices, communicating via an external bus. Alternatively, the microprocessor and storage medium may be within the same device, communicating via an internal bus. Logic, such the functionality described here (including the functionality of the evaluation unit), may be implemented in software stored in storage medium and/or stored within microprocessor. For example, the logic to control various elements (such as the magnetic assembly and/or the exciter assembly) and/or to perform various determinations (such as described with respect to evaluation unit 45) may be implemented in software and may be configured to control one or more aspects of the forage harvester as described herein.

Multiple variations in determining the decree of edge sharpness are contemplated. In a first implementation, the evaluation unit 45 may access a table or other data construct correlating measurements with different states of wear. In particular, a learning process may be performed in which the relevant measurand for different states of wear is detected and saved. From these values, a characteristic map or table may be generated that forms the basis for the evaluation unit 45 subsequently determining the degree of edge sharpness, e.g., a value that represents the degree of edge sharpness.

Thus, as a general matter, the evaluation unit 45 is configured to determine the degree of edge sharpness of the respective cutting blade 14 from an amount, such as a peak value, of the at least one measurand, and/or a characteristic of the at least one measurand during a rotation of the cutter drum 13. The rotation of the cutter drum 13 may yield an ongoing change of the magnetic fluxes in the respective magnetic circuits 38, 39 due to the movement of the cutting blades 14, whose change may be dependent on the degree of edge sharpness and may be easily detectable by the aforementioned induced voltage (or other circuit criterion).

Furthermore, in one implementation, the above-described magnetic assembly 17 is positioned outside of the material infeed area M. This results in the components of the magnetic assembly 17 not being subject to any, or to reduced, wear from material of the harvested material stream S flowing thereby.

FIG. 1 illustrates different alternative installation sites for the magnetic assembly 17 at issue. Common to the contemplated alternatives is that the magnetic assembly 17 is positioned at a location at which the harvested material stream S passes after its comminution in the operating area of the cutting blades 14 and the shear bar 15. In this implementation, the magnetic assembly 17 is therefore not arranged in the region before the aforementioned operating area. Consequently, the magnetic assembly 17 does not come into contact (or comes into less contact) with the still comparatively large, unchopped material of the harvested material stream S, but rather at most with the comminuted material, or with no material at all.

According to a particular implementation, the magnetic assembly 17, as shown in FIG. 1 and for contemplated assembly alternatives, is positioned outside of the area between the cutter drum 13 and the drum housing 2a through which the comminuted harvested material is removed.

In one implementation, when the two installation sites of the magnetic assembly 17 in FIG. 1 are to the right of the cutter drum 13, the magnetic assembly 17 is always positioned outside of the drum housing 2a surrounding the cutter drum 13, or outside of the drum floor 58, drum top 59 and drum rear wall 60.

In an alternate implementation, when the installation site of the magnetic assembly 17 in FIG. 1 is to the left of the cutter drum 13, the magnetic assembly 17 may be positioned behind the shear bar 15 in the direction of rotation of the cutter drum 13, may be positioned vertically below the shear bar 15.

Thus, the installation sites shown as an example in FIG. 1 results in the magnetic assembly 17 not coming into contact (or coming into less contact) with the harvested material stream S either before its comminution in the operating area, or after its comminution in the operating area.

Though not illustrated, in one implementation, it is contemplated that the magnetic assembly 17 be positioned within the area between the cutter drum 13 and drum housing 2a through which the comminuted harvested material stream S is removed. In this case, the magnetic assembly 17 does come into contact with the material of the harvested material stream S, but it is not exposed to such high wear as in the area of an assembly before comminution by means of the cutting mechanism, such as being if the magnetic assembly were positioned before the operating area, or within the material inflow area M.

As described previously, the drum housing 2a may comprise a drum floor 58, a drum top 59 and a drum rear wall 60, whereby the cutter drum 13 rotates between the drum floor 58 and drum top 59 relative to the direction of gravity. Between the drum floor 58 and drum top 59, an opening is provided in the rear-wall part of the cutting mechanism 2 through which the harvested material stream S is guided into a discharge or ejection channel 12. In the ejection channel 12, additional devices processing the harvested material stream S may be included, such as a grain cracker, which may be configured to break up the harvested material, such as corn grains. In this case, the magnetic assembly 17, as shown in FIG. 1, may be positioned either on the drum floor 58 or on the drum top 59.

In this instance, at least a part of the drum housing 2a is made of non-magnetic material. For example, at least one, a combination, or all of the drum floor 58, the drum top 59 or the drum rear wall 60 on which the magnetic assembly 17 is arranged according to the two alternatives may be composed (such as entirely composed) of a nonmagnetic material, such as stainless steel. In this way, the material of the drum housing 2a does not have any, or at least no noteworthy influence (such as no or little magnetic interference) on the functioning of the edge sharpness detection device 1 used as disclosed.

LIST OF REFERENCE NUMBERS

1. Detection arrangement
2. Cutting mechanism
2a Drum housing
3. Forage harvester
4. Harvesting header
5. Prepressing unit
6. Pressing channel
7, 8, 9, 10 Prepressing rollers 11 Delivery apparatus
12 Ejection channel
13 Cutter drum
14 Cutting blade
15 Shear bar
16 Cutting edge
17 Magnetic assembly
18 Exciter assembly
19 Flux guiding apparatus
20 Pole apparatus
21, 22, 23 Poles
21a Pole surface
29 Air gap assembly
30, 31, 32 Air gap
38, 39 Magnetic circuit
44 Measuring assembly
45 Evaluation unit
46 Longitudinal extension
47 Central section of the flux guiding device
48, 49 Exciter magnets
55, 56, 57 Measuring unit
58 Drum floor
59 Drum top
60 Drum rear wall
B Width
$L_1$, $L_2$ Longitudinal section
M Material inflow area
S Harvested material stream Each of the items listed above may be associated with a single electronic device or may be combined within a single electronic device. Further, with regard to each separate electronic device, processing/memory functionality may be included.

The methods, devices, processing, circuitry, and logic described above may be implemented in many different ways and in many different combinations of hardware and software. As discussed above, a microprocessor and a memory unit may be used. The microprocessor and memory unit are merely one example of a computational configuration. Other types of computational configurations are contemplated. For example, all or parts of the implementations may be circuitry that includes a type of controller, including as an instruction processor, such as a Central Processing Unit (CPU), microcontroller, or a microprocessor; or as an Application Specific Integrated Circuit (ASIC); Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may implement the functionality described herein and may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A forage harvester comprising:
a cutting mechanism configured to comminute a harvested material stream, the cutting mechanism including a cutter drum with a plurality of cutting blades and at least one shear bar configured to interact with the plurality of cutting blades in order to comminute the harvested material stream, wherein the cutting mechanism is supplied the harvested material stream by a prepressing unit, wherein a location at which the plurality of cutting blades interact with the at least one shear bar to comminute the harvested material stream comprises a material inflow area; and
an edge sharpness detection device configured to detect at least one aspect of edge sharpness of the cutting mechanism and comprising at least one magnetic circuit and a magnetic assembly;
wherein the edge sharpness detection device is configured to excite the at least one magnetic circuit using the magnetic assembly, wherein the at least one magnetic circuit is closed by a respective cutting blade during a rotation of the cutter drum once the respective cutting blade passes the magnetic assembly;
wherein at least part of a magnetic flux of the at least one magnetic circuit closed by the respective cutting blade is guided lengthwise at least along a longitudinal section of the respective cutting blade;
wherein the edge sharpness detection device is configured to detect the magnetic flux in the at least one magnetic circuit and, based on a detected change of a magnetic measurement relating to the magnetic flux, determine the at least one aspect of edge sharpness of the respective cutting blade; and wherein the magnetic assembly is positioned at least partly outside of the material inflow area of the cutting mechanism.

2. The forage harvester of claim 1, wherein the magnetic assembly is entirely outside of the material inflow area of the cutting mechanism.

3. The forage harvester of claim 1, wherein the magnetic assembly is positioned at a location at which the harvested material stream passes by after its comminution by the plurality of cutting blades and the at least one shear bar.

4. The forage harvester of claim 1, wherein the cutting mechanism includes a housing drum in which the cutter drum rotates; and
wherein the harvested material stream is guided away from the at least one shear bar after its comminution by the interaction of the plurality of cutting blades and the at least one shear bar between the cutter drum and the housing drum.

5. The forage harvester of claim 4, wherein the magnetic assembly is positioned outside of an area between the cutter drum and the housing drum through which the harvested material stream is guided after its comminution.

6. The forage harvester of claim 5, wherein the magnetic assembly is positioned outside of the housing drum, which surrounds the cutter drum.

7. The forage harvester of claim 4, wherein the magnetic assembly is positioned within an area between the cutter drum and the housing drum through which the harvested material stream is guided after its comminution.

8. The forage harvester of claim 1, wherein the magnetic assembly is positioned relative to the material inflow area such that the magnetic assembly does not come into contact with the harvested material stream before its comminution effectuated by the interaction of the plurality of cutting blades and the at least one shear bar or after its comminution effectuated by the interaction of the plurality of cutting blades and the at least one shear bar.

9. The forage harvester of claim 1, wherein the magnetic assembly is positioned relative to the material inflow area such that the magnetic assembly does not come into contact with the harvested material stream before its comminution effectuated by the interaction of the plurality of cutting blades and the at least one shear bar and after its comminution effectuated by the interaction of the plurality of cutting blades and the at least one shear bar.

10. The forage harvester of claim 1, wherein, in a direction of rotation of the cutter drum, the magnetic assembly is positioned behind the at least one shear bar or vertically below the at least one shear bar.

11. The forage harvester of claim 1, wherein, in a direction of rotation of the cutter drum, the magnetic assembly is positioned behind the at least one shear bar and vertically below the at least one shear bar.

12. The forage harvester of claim 1, wherein the cutting mechanism includes a housing drum in which the cutter drum rotates;
wherein the housing drum comprises a drum floor, a drum top and a drum rear wall; and
wherein after its comminution, the harvested material stream is guided out of the housing drum into a discharge channel through an opening between the drum floor and the drum top.

13. The forage harvester of claim 12, wherein the magnetic assembly is positioned on at least one of the drum floor, the drum top, or the drum rear wall of the housing drum.

14. The forage harvester of claim 13, wherein at least a part of the housing drum is composed of non-magnetic material.

15. The forage harvester of claim 13, wherein the drum floor, the drum top, and the drum rear wall are composed of non-magnetic material.

16. The forage harvester of claim 1, wherein the magnetic assembly comprises a pole assembly positioned stationary relative to the cutter drum that forms a first magnetic pole, a second magnetic pole and a third magnetic pole, each of the first magnetic pole, the second magnetic pole and the third magnetic pole comprising a respective pole surface to discharge the magnetic flux;
wherein the edge sharpness detection device comprises an exciter assembly configured to generate at least a first magnetic circuit and a second magnetic circuit, the first magnetic circuit flowing through the first magnetic pole and the second magnetic pole, the second magnetic circuit flowing through the second magnetic pole and the third magnetic pole;
wherein each of the first magnetic circuit and the second magnetic circuit are closed by the respective cutting blade during the rotation of the cutter drum;
wherein at least a part of the magnetic flux of the first magnetic circuit is guided lengthwise along a first section of the respective cutting blade;
wherein at least a part of the magnetic flux of the second magnetic circuit is guided lengthwise along a second section of the respective cutting blade; and
wherein the first section of the respective cutting blade and the second section of the respective cutting blade are not co-extensive.

17. The forage harvester of claim 16, wherein the edge sharpness detection device includes only a single magnetic assembly in order to generate a magnetic field in the first magnetic circuit and the second magnetic circuit sufficient to perform edge sharpness detection along the first section of the respective cutting blade and the second section of the respective cutting blade.

18. The forage harvester of claim 16, wherein the first section of the respective cutting blade and the second section of the respective cutting blade abut one another.

19. The forage harvester of claim 16, wherein the edge sharpness detection device is configured to detect the at least one aspect of edge sharpness by:
determining a change in the magnetic flux of the first magnetic circuit as a representation of a degree of edge sharpness of the first section of the respective cutting blade; and
determining a change in the magnetic flux of the second magnetic circuit as a representation of a degree of edge sharpness of the second section of the respective cutting blade.

20. The forage harvester of claim 19, wherein the edge sharpness detection device is configured to detect a first flaw in the first section of the respective cutting blade based on the determined change in the magnetic flux of the first magnetic circuit; and
wherein the edge sharpness detection device is configured to detect a second flaw in the second section of the respective cutting blade based on the determined change in the magnetic flux of the second magnetic circuit.

* * * * *

UNITED STATES PATENT AND TRADEMARK OFFICE
CERTIFICATE OF CORRECTION

PATENT NO. : 11,109,537 B2
APPLICATION NO. : 16/217537
DATED : September 7, 2021
INVENTOR(S) : Dennis Neitemeier et al.

Page 1 of 1

It is certified that error appears in the above-identified patent and that said Letters Patent is hereby corrected as shown below:

On the Title Page

Item (54), and in the Specification Column 1, Line 2:
Correct the word "ASSEBMLY" to "ASSEMBLY"

Signed and Sealed this
Twenty-seventh Day of August, 2024

Katherine Kelly Vidal
*Director of the United States Patent and Trademark Office*